United States Patent
Reeves et al.

(10) Patent No.: US 10,051,548 B1
(45) Date of Patent: Aug. 14, 2018

(54) WIRELESS RELAY TO CONTROL WIRELESS SIGNAL SCANNING BASED ON REATTACHMENT ATTRIBUTES

(71) Applicant: Sprint Communications Company L.P., Overland Park, KS (US)

(72) Inventors: Raymond Emilio Reeves, Oviedo, FL (US); Dwight Devan Inman, Travelers Rest, SC (US); Calvin D. Mayfield, Kansas City, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 56 days.

(21) Appl. No.: 15/395,508

(22) Filed: Dec. 30, 2016

(51) Int. Cl.
| | | |
|---|---|---|
| *H04W 40/20* | (2009.01) | |
| *H04W 40/22* | (2009.01) | |
| *H04W 24/10* | (2009.01) | |
| *H04W 76/02* | (2009.01) | |
| *H04W 76/19* | (2018.01) | |

(52) U.S. Cl.
CPC ........... *H04W 40/22* (2013.01); *H04W 24/10* (2013.01); *H04W 40/20* (2013.01); *H04W 76/028* (2013.01); *H04W 76/19* (2018.02)

(58) Field of Classification Search
CPC ..... H04W 40/22; H04W 76/19; H04W 40/20; H04W 24/10; H04W 76/028
See application file for complete search history.

(56) References Cited

U.S. PATENT DOCUMENTS

| | | | |
|---|---|---|---|
| 8,559,957 B2 | 10/2013 | Hunzinger | |
| 2008/0198829 A1* | 8/2008 | Cheng | H04W 84/18 370/342 |
| 2013/0194948 A1 | 8/2013 | Mallik et al. | |
| 2016/0269132 A1* | 9/2016 | Clark | H04W 16/28 |
| 2016/0337916 A1* | 11/2016 | Deenoo | H04W 8/22 |

* cited by examiner

*Primary Examiner* — Lakeram Jangbahadur

(57) ABSTRACT

A wireless relay controls wireless scanning in a wireless data communication network. The wireless relay performs a 360-degree wireless signal scan, and attaches to a source wireless access point responsive to the wireless signal scan. The wireless relay reports results from the wireless signal scan to a relay information server responsive to the attachment. The wireless relay receives attachment data from the relay information server responsive to the reporting. If the wireless relay loses connectivity to the source wireless access point, then the wireless relay determines reattachment attributes based on the attachment data, and performs another wireless signal scan based on the reattachment attributes.

18 Claims, 5 Drawing Sheets

US 10,051,548 B1

WIRELESS RELAY TO CONTROL WIRELESS SIGNAL SCANNING BASED ON REATTACHMENT ATTRIBUTES

TECHNICAL BACKGROUND

Data communication systems exchange user data for user equipment to provide various data communication services. The user equipment may be phones, computers, media players, intelligent machines, and the like. The data communication services might be media streaming, video conferencing, machine-to-machine data transfers, Internet access, or some other computerized information service. Data communication systems use wireless access points to extend the range of their communication services and enable user mobility. The wireless access points perform wireless networking tasks like device handovers, radio interference management, and multipoint coordination. In Long Term Evolution (LTE) networks, the wireless access points are evolved Node Bs (eNodeBs).

To extend the wireless service footprint even more, wireless relays are used between the wireless access points and the user equipment. A wireless relay exchanges wireless signals that transport user data with user equipment. The wireless relay also exchanges corresponding wireless signals that transport the user data with the wireless access points. The wireless relay may attach to several wireless access points to obtain better service for the user equipment. To attach to the one or more wireless access points, the wireless relays must perform a wireless signal scan. The wireless relays may perform a full 360-degree wireless signal scan before attaching to a wireless access point. The wireless relays may lose connectivity and need to perform another 360-degree wireless signal scan, this process is time consuming and inefficient.

TECHNICAL OVERVIEW

Examples disclosed herein provide a system, method, hardware, and software to control wireless scanning in a wireless data communication network. The method includes a wireless relay performing a 360-degree wireless signal scan, and attaching to a source wireless access point responsive to the wireless signal scan. The method also includes the wireless relay reporting results from the wireless signal scan to a relay information server responsive to the attachment. The method further includes the wireless relay receiving attachment data from the relay information server responsive to the reporting. If wireless relay loses connectivity to the source wireless access point, then the method includes the wireless relay determining reattachment attributes based on the attachment data, and performing another wireless signal scan based on the reattachment attributes.

DETAILED DESCRIPTION

Figure 1:
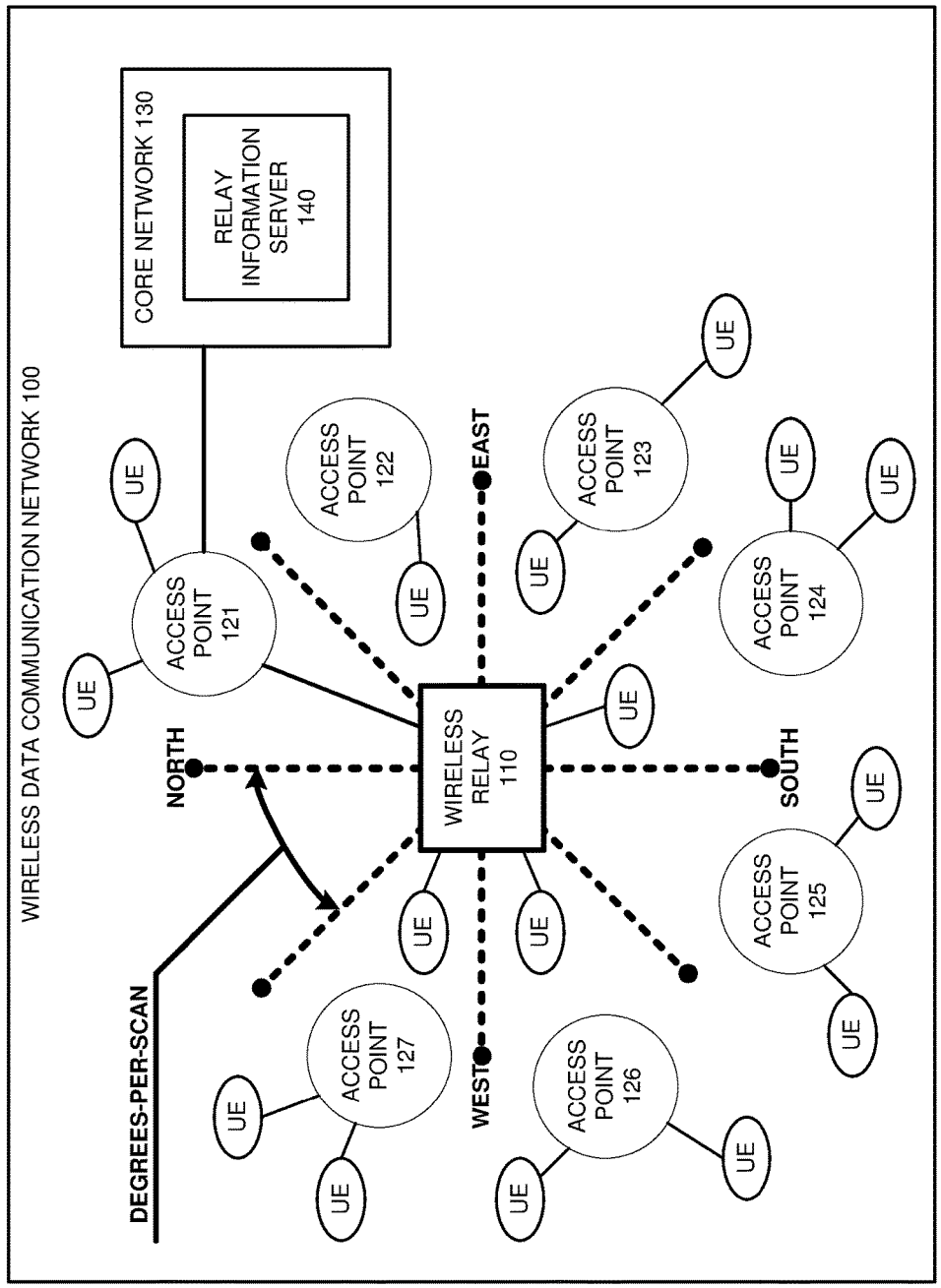
FIG. 1 illustrates a wireless data communication network with a wireless relay that controls wireless scanning based on reattachment attributes.

FIG. 1 illustrates wireless data communication network 100 with wireless relay 110 that controls wireless scanning based on reattachment attributes. FIG. 1 includes wireless relay 110, wireless access points 121-127, and core network 130 that includes relay information server 140. Various User Equipment (UEs) are connected to wireless relay 110 and access points 121-127.

Wireless relay 110 includes a wireless transceiver to serve some of the UEs. Wireless relay 110 also includes another wireless transceiver to communicate with wireless access points 121-127. Wireless relay 110 comprises antennas, modulators, amplifiers, filters, and signal processing circuitry. Wireless relay 110 also includes data processing systems with circuitry, memory, and software. In some examples, the wireless relays may be mounted on a rotating platform that allows them to swivel 360-degrees to perform the wireless signal scan for the best signal from potentially serving wireless access points. In other examples, the wireless relays may comprise multiple antennas elements and circuitry to electronically perform wireless scans.

Wireless access points 121-127 comprise antennas, modulators, amplifiers, filters, and signal processing circuitry for wireless communication with the UEs and with wireless relay 110. Wireless access points 121-127 include network interfaces like switches and routers for data communications with core network 130. Wireless access points 121-127 include data processing systems with circuitry, memory, and software. In some examples, wireless access points 121-127 comprise Long Term Evolution (LTE) evolved Node Bs (eNodeBs).

Core network 130 comprises computer equipment with software, such as packet gateways, network controllers, authorization databases, and the like. In some examples, core network 130 comprises an LTE or System Architecture Evolution (SAE) core. The LTE/SAE core typically includes Serving Gateways (S-GWs), Mobility Management Entities (MMEs), Home Subscriber Systems (HSS), Packet Data Network Gateways (P-GWs), and Policy Charging Rules Functions (PCRFs). Relay information server 140 comprises computer equipment with software to serve attachment data.

Referring to FIG. 1, wireless data communication network 100 exchanges user data for various User Equipment (UE). Examples of UEs include a computer, phone, or some other intelligent machine with a wireless communication transceiver. These data exchanges support data services such as content streaming, media conferencing, machine communications, internet access, or some other computerized information service.

Prior to serving any UEs, wireless relay 110 individually attaches to at least one of wireless access points 121-127. The wireless access point attachment(s) may be part of the boot-up or reset process for wireless relay 110. In some examples, wireless relay 110 needs to reattach to the wireless access points after a power outage or scheduled reboot. Wireless relay 110 performs an initial 360-degree wireless signal scan to attach to source wireless access point 121. In some examples, wireless relay 110 may attach to more than one of wireless access points 121-127.

For example, wireless relay 110 might scan the sectors in rotation from an initial starting point until a radial scan or 360-degrees is covered. In an alternative, wireless relay 110 may start at north and perform scans in rotation at the designated degrees-per-scan until 360 degrees are covered. With 90 degrees-per-scan, four scans are needed to cover the full 360 degrees. With 30 degrees-per-scan, 12 scans are needed to cover the full 360 degrees. Wireless relay 110 performs wireless scans at the designated degrees-per-scan to select and attach to additional wireless access points. If multiple wireless access points are detected in the same azimuth or sector, then wireless relay 110 selects the wireless access point with the strongest wireless signal or best signal quality. Certain sectors or degrees may be designated to be skipped. In addition, specific wireless access points may be avoided. Other scanning techniques could be used to select the source wireless access point.

Wireless relay 110 wirelessly attaches to source wireless access point 121. For example, wireless relay 110 may perform a LTE Radio Resource Control (RRC) attachment process. Wireless relay 110 reports the results from the wireless signal scan to relay information server 140. For example, wireless relay 110 may determine or receive a geographic location for each wireless access point 121-127 and associate each wireless access point 121-127 with a sector of the 360-degree wireless signal scan. Wireless relay 110 may also determine and report its location. Wireless relay 110 may also determine a wireless metric, such as signal quality, load, latency, etc. from wireless access points 121-127, and report these results. For relay chains or trees, wireless relay 110 could determine a relay hop-count. Reporting results may also include UE applications.

Wireless relay 110 receives attachment data from relay information server 140, in response to reporting the scan results. Wireless relay 110 detects a loss of connectivity to access point 121. Wireless relay 110 determines reattachment attributes based on the attachment data received from relay information server 140. For example, reattachment attributes may comprise a starting geographic location, a starting sector, number of degrees-per-scan, different degrees-per scan for different scans (i.e. a first scan that is 180-degrees and two subsequent scans of 90-degree each), target access point(s), a new source access point, wireless access points to avoid, and/or sectors or degrees to avoid— including combinations thereof.

Advantageously, wireless relay 110 applies intelligence to control and optimize the wireless signal scans and attachments that are performed at boot-up or reset. Core network 130 may configure the attachment data to assert control over the number of scans or the degrees-per-scan. The scanning control can be used to reduce the load on network resources. The scanning control can be used to assert Quality-of-Service (QoS) for wireless relays by differentiating the number of scans and wireless access points that are allowed per relay.

Figure 2:
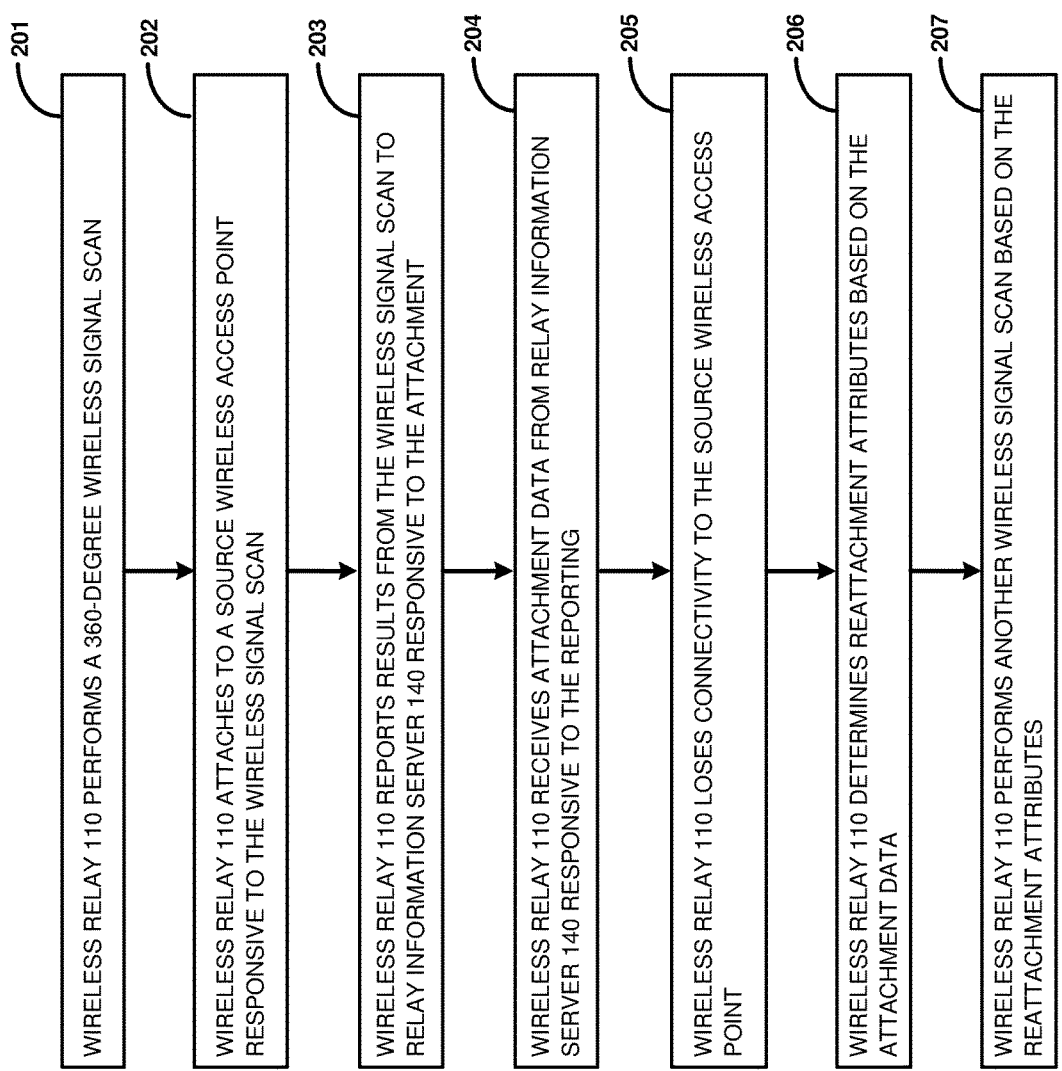
FIGS. 2-3 illustrate the operation of the wireless data communication network with the wireless relay that controls wireless scanning based on reattachment attributes.

FIG. 2 illustrates the operation of wireless relay 110 to control wireless scanning based on reattachment attributes. Wireless relay 110 performs a 360-degree wireless signal scan (201). Wireless relay 110 attaches to a source wireless access point, responsive to the wireless signal scan (202). Wireless relay 110 reports results from the wireless signal scan to relay information server 140 (203). Wireless relay 110 receives attachment data from relay information server 140, responsive to the reporting (204). Wireless relay 110 loses connectivity to the source wireless access point (205). Wireless relay 110 determines reattachment attributes based on the attachment data (206). Wireless relay 110 performs another wireless signal scan based on the reattachment attributes (207).

Figure 3:
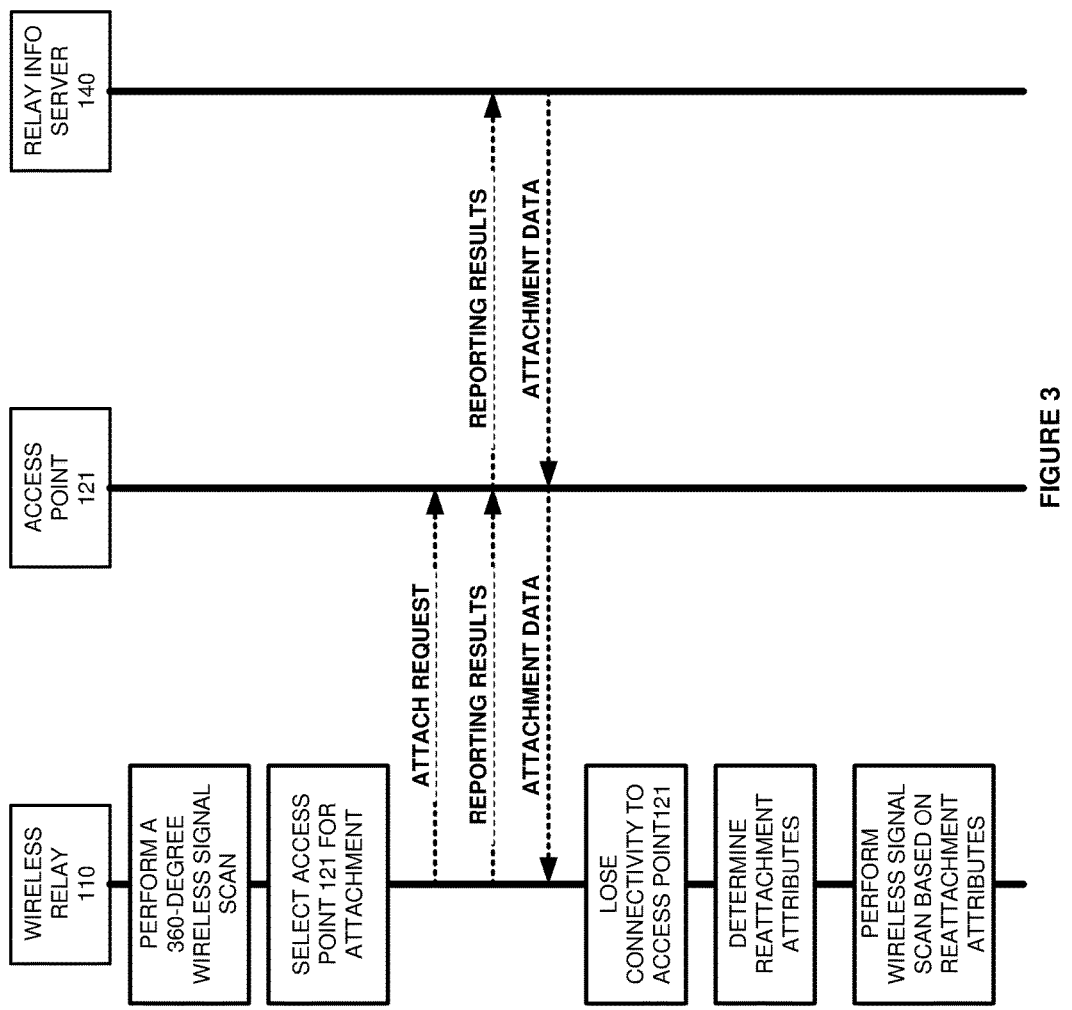

FIG. 3 illustrates the operation of wireless data communication network 100 to control wireless scanning in wireless relay 110 based on reattachment attributes. Referring to FIG. 3, Wireless relay 110 performs a 360-degree wireless signal scan. Wireless relay 110 selects at least one wireless access point discovered during the wireless signal scan for attachment. Wireless relay 110 attaches to source wireless access point 121, responsive to the wireless signal scan.

Wireless relay 110 reports results from the wireless signal scan to relay information server 140. In some examples, wireless relay 110 has a backhaul connection to the core network. In other examples, wireless relay 110 transmits the scan results to wireless access point 121 for delivery to the core network. Wireless relay 110 receives attachment data from relay information server 140, responsive to reporting the results of the wireless signal scan. Wireless relay 110 loses connectivity to source wireless access point 121. Wireless relay 110 determines reattachment attributes based on the attachment data. Wireless relay 110 performs another wireless signal scan based on the reattachment attributes to attach to another source wireless access point.

Figure 4:
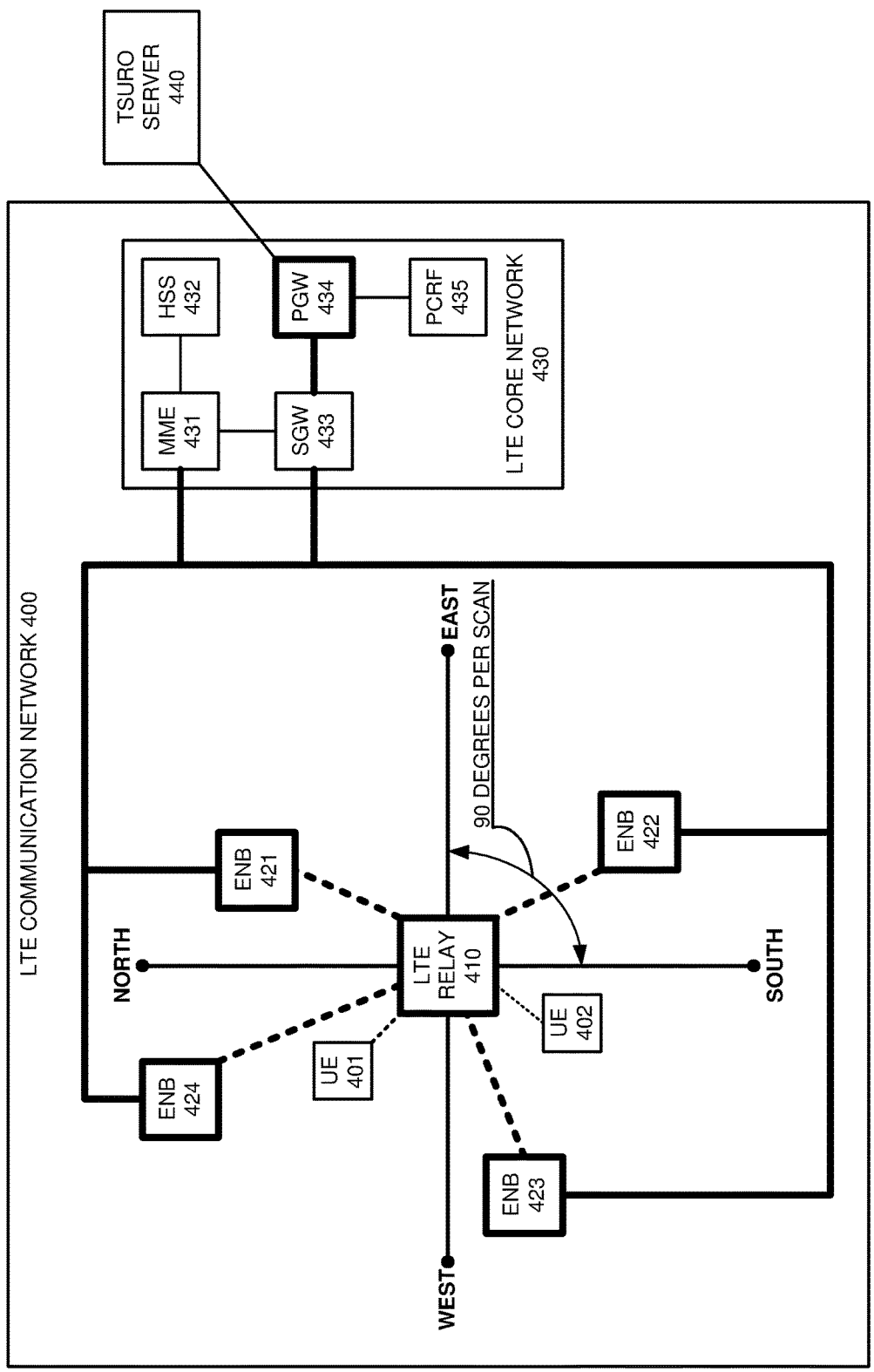
FIG. 4 illustrates a Long Term Evolution (LTE) communication network with a wireless relay that controls wireless scanning based on reattachment attributes.
Figure 5:
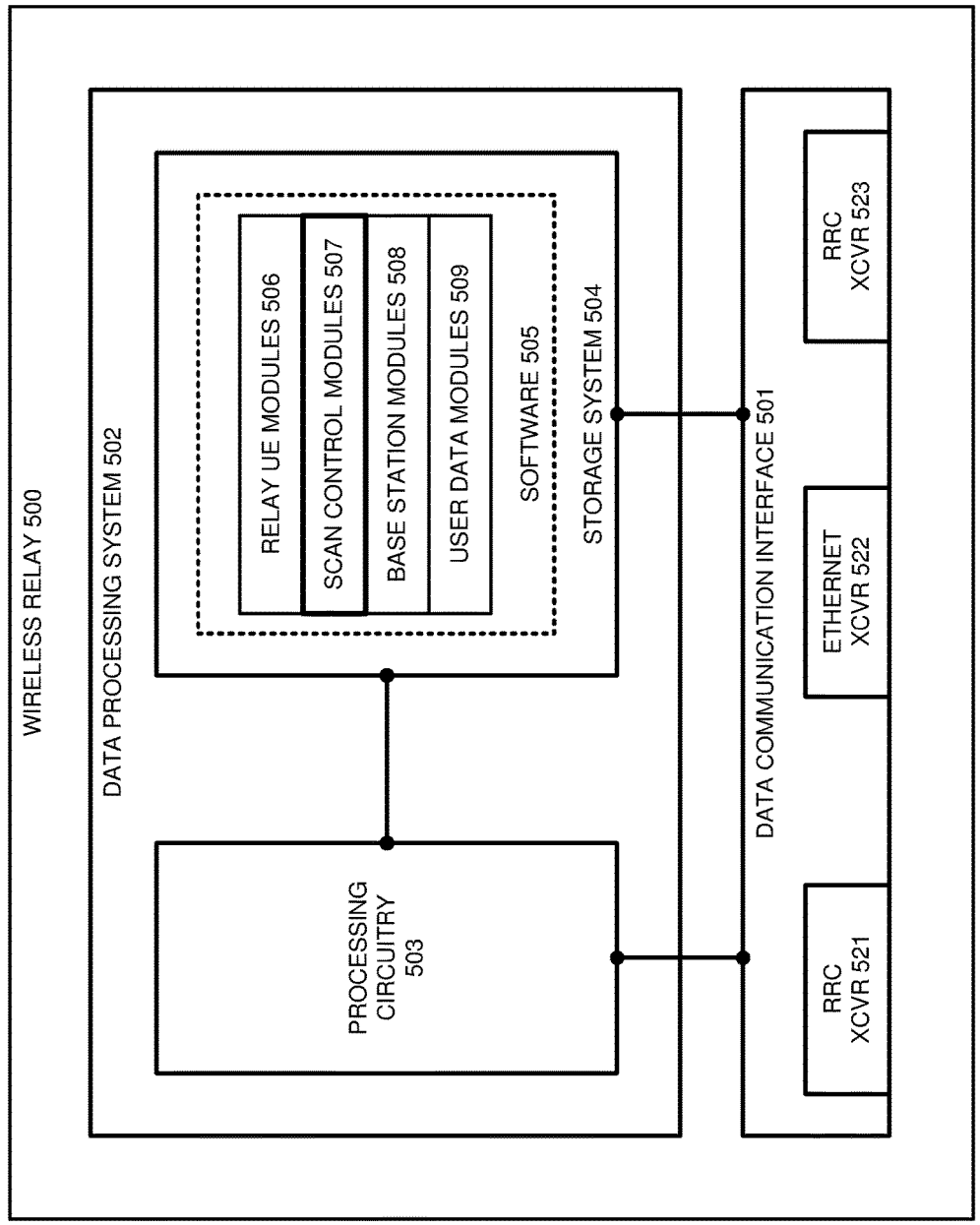
FIG. 5 illustrates a wireless relay to control wireless scanning based on reattachment attributes.

FIG. 4 illustrates Long Term Evolution (LTE) communication network 400 with LTE wireless relay 410 that controls wireless scanning based on reattachment attributes. LTE communication network 400 is an example of wireless data communication network 100, although network 100 may use alternative configurations and operations. LTE communication network 400 comprises UEs 401-402, LTE wireless relay 410, eNodeBs (ENB) 421-424, LTE core network system 430, and a Time-Sensitive UE Relay (UER) Reconnect Optimization (TSURO) server 440. LTE core network system 430 comprises Mobility Management Entity (MME) 431, Home Subscriber System (HSS) 432, Serving Gateway (S-GW) 433, Packet Data Network Gateway (P-GW) 434, and Policy Charging Rules Function (PCRF) 435.

Before UEs 401-402 attach, wireless relay 410 scans and attaches to at least one source eNodeB using an LTE Radio Resource Control (RRC) attachment process. For instance, wireless relay 410 upon power up would perform a full rotational 360-degree wireless signal scan to detect all potential serving cell systems while collecting all relevant metrics that would help it determine the best serving system upon completion of the wireless signal scan. Upon determining that the sector including eNodeB 421 carries the best signal.

Wireless relay 410 attaches to eNodeB 421. Source eNodeB 421 transfers a corresponding S1-MME Initial UE request for wireless relay 410 to MME 431 in network core 430. MME 431 receives the S1-MME Initial UE request and exchanges Diameter messages with HSS 432 to authenticate and authorize wireless relay 410. MME 431 receives an Access Point Name (APN) for wireless relay 410 from HSS 432. MME 431 then transfers an S11 Create Session request with the APN to S-GW 433. S-GW 433 transfers an S5 Create Bearer request with the APN to P-GW 434. P-GW 434 exchanges Diameter messages with PCRF 435 to translate the APN into a Quality-of-Service Class Indicator (QCI) for wireless relay 410. P-GW 434 receives the QCI for wireless relay 410 from PCRF 435.

After performing the wireless signal scan, wireless relay 410 reports the results from the wireless signal scan to TSURO server 440. For example, wireless relay 410 may determine or receive a geographic location for each eNodeB 421-424 and associate each eNodeB 421-424 with a sector of the 360-degree wireless signal scan. Wireless relay 410 may also determine and report its location. Wireless relay 410 may also determine a wireless metric, such as signal quality or load from eNodeBs 421-424, and report these results. Over time, TSURO server 440 collects performance details regarding all potential serving cell systems visible to the wireless relays. Should wireless relay 410 lose connectivity to eNodeB 421, wireless relay 410 can use the reattachment data to quickly perform a wireless signal scan to reconnect to another eNodeB.

Wireless relay 410 receives attachment data from TSURO server 440, in response to reporting the scan results. Wireless relay 410 detects a loss of connectivity to eNodeB 421. Wireless relay 410 determines reattachment attributes based on the attachment data received from TSURO server 440. Wireless relay 410 translates the attachment data into reattachment attributes, such as an amount of degrees-per-scan. The amount of degrees-per-scan designates a geographic azimuth or sector over the Earth's surface. In this example, wireless relay 410 translates the attachment data into 90 degrees-per-scan, so four scans are needed to cover a full 360 degrees. Other degrees-per-scan numbers could be used like 60 degrees for 6 scans or 15 degrees for 24 scans. In addition to the degrees-per scan, wireless relay 410 may translate the attachment data into other reattachment attributes, such as relay location, source wireless signal quality, relay hop-count, relay type, or some other networking information.

The reattachment attributes may indicate that wireless relay 410 should start the wireless signal scan in the sector including eNodeB 424, rather than starting at the original start location or from the current location. Wireless relay 410 detects eNodeB 424 during the wireless signal scan, and using the LTE RRC attachment process. ENodeB 424 transfers a corresponding S1-MME Initial UE request for wireless relay 410 to MME 431 in network core system 430. MME 431 receives the S1-MME Initial UE request and exchanges Diameter messages with HSS 432 to authenticate and authorize wireless relay 410. MME 431 receives an APN for wireless relay 410 from HSS 432. MME 431 then transfers an S11 Create Session request with the APN to S-GW 433. S-GW 433 transfers an S5 Create Bearer request with the APN to P-GW 434. P-GW 434 exchanges Diameter messages with PCRF 435 to translate the APN into a QCI for wireless relay 410. P-GW 434 receives the QCI for wireless relay 410 from PCRF 435.

UEs 401-402 then wirelessly attach to wireless relay 410. UEs 401-402 exchange wireless user data with wireless relay 410. Wireless relay 410 wirelessly exchanges the user data with attached source eNodeB 424. Attached source eNodeB 424 exchanges the user data with S-GW 433. S-GW 433 exchanges the user data with P-GW 434. P-GW 434 exchanges the user data with IP routers for subsequent handling.

TSURO server 440 may receive a list of all available cell systems from all wireless relays or UE relay units upon their completing a 360-degree wireless signal scan, in addition to signal or network characteristics (i.e. availability, error rates, current load levels, SNR, signal strength, supported services, etc.) detected during the scan process. TSURO server 440 collects all the wireless scan results reported from the wireless relays and based on these scan results, TSURO server 440 generates and periodically distributes to each wireless relay reattachment data. The wireless relays use the reattachment data to optimize any future reconnection event. Advantageously, reconnection may be optimized to prevent a reconnection flood should several wireless relay units experience simultaneous failures. Advantageously, TSURO server 440 controls the number of wireless scans and eNodeB attachments that is performed based on the reattachment data.

FIG. 6 illustrates wireless relay 500 to control wireless scanning based on reattachment attributes. Wireless relay 500 is an example of wireless relays 110 and 410, although relays 110 and 410 may use alternative configurations and operations. Wireless relay 500 comprises data communication interface 501 and data processing system 502. Data communication interface 501 comprises RRC transceiver 521, Ethernet transceiver 522, and RRC transceiver 523. Data processing system 502 comprises processing circuitry 503 and storage system 504. Storage system 504 stores software 505. Software 505 includes respective software modules 506-509.

Transceivers 521-523 comprise communication components, such as antennas, amplifiers, filters, modulators, ports, bus interfaces, digital signal processors, memory, software, and the like. Processing circuitry 503 comprises circuit boards, bus interfaces, integrated micro-processing circuitry, and associated electronics. Storage system 504 comprises non-transitory, machine-readable, data storage media, such as flash drives, disc drives, memory circuitry, data servers, and the like. Software 505 comprises machine-readable instructions that control the operation of processing circuitry 503 when executed. Wireless relay 500 may be centralized or distributed. All or portions of software 506-509 may be externally stored on one or more storage media, such as circuitry, discs, and the like. Some conventional aspects of wireless relay 500 are omitted for clarity, such as power supplies, enclosures, and the like.

When executed by processing circuitry 503, software modules 506-509 direct circuitry 503 to perform the following operations. Relay UE modules 506 direct RRC transceiver 523 to interact with donor eNodeBs. Relay UE modules 506 scan for donor eNodeBs under the direction of scan control modules 507. Thus, Relay UE modules 506 direct RRC transceiver 523 to detect the wireless access points in a sector.

Scan control modules 507 process attachment data to determine reattachment attributes and controls wireless signal scanning based on the reattachment attributes. Base station modules 508 direct RRC transceiver 521 to interact with UEs. User data modules 509 exchange user data between transceivers 521-523.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless relay to control wireless scanning in a wireless data communication network, the method comprising:

the wireless relay performing a 360-degree wireless signal scan for one or more wireless access points;

the wireless relay attaching to a source wireless access point responsive to the wireless signal scan;

the wireless relay reporting results from the wireless signal scan to a relay information server responsive to the attachment;

the wireless relay receiving attachment data from the relay information server responsive to the reporting;

the wireless relay losing connectivity to the source wireless access point;

the wireless relay determining reattachment attributes based on the attachment data; and the wireless relay performing another wireless signal scan based on the reattachment attributes, wherein the reattachment attributes comprise at least one wireless access point to avoid.

2. The method of claim 1 wherein the reattachment attributes comprise a starting geographic direction.

3. The method of claim 1 wherein the reattachment attributes comprise ninety-degrees per scan.

4. The method of claim 1 wherein the reattachment attributes comprise different degrees for different scans.

5. The method of claim 1 wherein the reattachment attributes comprise target wireless access points.

6. The method of claim 1 wherein the reattachment attributes comprise a new source wireless access point.

7. The method of claim 1 wherein the reattachment attributes comprise scanning degrees to avoid.

8. The method of claim 1 wherein the reporting results comprise a relay geographic location.

9. The method of claim 1 wherein the reporting results comprise a User Equipment (UE) application.

10. A wireless relay to control wireless scanning in a wireless data communication network, the wireless relay comprising:

a wireless transceiver configured to perform a 360-degree wireless signal scan for one or more wireless access points;

the wireless transceiver configured to attach to a source wireless access point responsive to the wireless signal scan;

the wireless transceiver configured to report results from the wireless signal scan to a relay information server responsive to the attachment;

the wireless transceiver configured to receive attachment data from the relay information server responsive to the reporting;

the wireless transceiver configured to detect a loss of connectivity to the source wireless access point;

a data processing system configured to determine reattachment attributes based on the attachment data; and the wireless transceiver configured to perform another wireless signal scan based on the reattachment attributes, wherein the reattachment attributes comprise at least one wireless access point to avoid.

11. The wireless relay of claim 10 wherein the reattachment attributes comprise a starting geographic direction.

12. The wireless relay of claim 10 wherein the reattachment attributes comprise ninety-degrees per scan.

13. The wireless relay of claim 10 wherein the reattachment attributes comprise different degrees for different scans.

14. The wireless relay of claim 10 wherein the reattachment attributes comprise target wireless access points.

15. The wireless relay of claim 10 wherein the reattachment attributes comprise a new source wireless access point.

16. The wireless relay of claim 10 wherein the reattachment attributes comprise scanning degrees to avoid.

17. The wireless relay of claim 10 wherein the reporting results comprise a relay geographic location.

18. The wireless relay of claim 10 wherein the reporting results comprise a User Equipment (UE) application.

* * * * *